US005537466A

United States Patent [19]
Taylor et al.

[11] Patent Number: 5,537,466
[45] Date of Patent: Jul. 16, 1996

[54] INTELLIGENT COMMUNICATIONS NETWORKS

[75] Inventors: Andrew P. Taylor; Steven Hollywood, both of Suffolk, England

[73] Assignee: British Telecommunications, plc., London, England

[21] Appl. No.: 311,751

[22] Filed: Sep. 23, 1994

[30] Foreign Application Priority Data

Aug. 4, 1994 [EP] European Pat. Off. .............. 94305854

[51] Int. Cl.$^6$ ..................................... H04M 3/42
[52] U.S. Cl. ........................ 379/201; 379/207; 379/67; 379/266
[58] Field of Search .................... 379/201, 265, 379/266, 207, 211, 212, 221, 67, 88, 89

[56] References Cited

U.S. PATENT DOCUMENTS

| | | | |
|---|---|---|---|
| 4,878,240 | 10/1989 | Lin et al. ................. | 379/67 |
| 5,029,200 | 7/1991 | Haas et al. ............... | 379/207 |
| 5,153,909 | 10/1992 | Beckle et al. ............ | 379/265 |
| 5,179,585 | 1/1993 | MacMillan, Jr. et al. ... | 379/201 |
| 5,199,062 | 3/1993 | Von Meister et al. ...... | 379/207 |
| 5,239,577 | 8/1993 | Bates et al. ............. | 379/201 |
| 5,241,588 | 8/1993 | Babson, III et al. ...... | 379/201 |
| 5,243,643 | 9/1993 | Sattar et al. ............ | 379/88 |
| 5,299,259 | 3/1994 | Otto ..................... | 379/221 |
| 5,317,627 | 5/1994 | Richardson, Jr. et al. .. | 379/88 |
| 5,329,578 | 7/1994 | Brennan et al. .......... | 379/201 |
| 5,355,406 | 10/1994 | Chencinski et al. ....... | 379/88 |
| 5,375,164 | 12/1994 | Jennings ................. | 379/88 |
| 5,386,467 | 1/1995 | Ahmad ................... | 379/207 |

FOREIGN PATENT DOCUMENTS

| | | |
|---|---|---|
| A0378694 | 7/1990 | European Pat. Off. . |
| 0531048A2 | 3/1993 | European Pat. Off. ......... H04M 3/42 |
| A1581477 | 12/1980 | United Kingdom . |
| WOA9117616 | 11/1991 | WIPO . |

OTHER PUBLICATIONS

O'Reilly et al, "Experiences In Prototyping the Intelligent Network", IEEE Global Telecommunications Conference, Nov. 19–Dec. 2, 1993, vol. 3/4, Houston (US), pp. 1923–1930.

Hollywood "SCP Development in a Multi–Porcessor Unix Environment", Proc. Int. Councel For Computer Communications, 4–6 May 1992, Tampa, pp. 278–287.

Van Hal et al, "Service Script Interpreter, an Advanced Intelligent Network Platform", Ericsson Review, vol. 67, No. 1, 1990, Stockholm, SE, pp. 12–22.

(List continued on next page.)

Primary Examiner—Jeffery Hofsass
Assistant Examiner—Scott Wolinsky
Attorney, Agent, or Firm—Nixon & Vanderhye

[57] ABSTRACT

A service node is used in an intelligent communications network to provide services for customers. The node includes a service defining sub-system arranged to define a plurality of services. A first resource has a memory for storing speech segments, each segment having a corresponding identity, and a resource controller is arranged to convert a received command signal to a corresponding succession of speech segment identities for a speech announcement corresponding to the command signal. The first resource accesses the memory storing speech segments in accordance with the speech segment identities, to generate the corresponding speech segments for the speech announcement and provides an "announcement finished" signal when a last speech segment of the announcement has been generated. A switch is arranged to connect the first resource to an incoming call routed by the network to the service node. A node control is arranged to respond to an incoming call (i) to pass details of the call to the service defining sub-system for processing and queuing the call for subsequent processing if required due to already ongoing call processing, (ii) to logically connect the service defining sub-system to the first resource and to the switch, and (iii) to pass "announcement finished" signals from the first resource to the service defining sub-system.

11 Claims, 10 Drawing Sheets

OTHER PUBLICATIONS

Bright et al, "Service Creation in an Intelligent Network", IEEE Global Telecommunications Conference & Exhibition, No. 27–30, 1989, vol. 1/3, Dallas (US), pp. 137–140.

Yang et al., "The Design and Implementation of a Service Logic Execution Environment Platform", IEEE, GTE Laboratories Incorporated, pp. 1911–1917.

Allard et al., "Switching of Information Services in the UK Network and Evolution Towards the Intelligent Network", International Switching Symposium Session B2 Paper #1, vol. 1, Stockholm, SE pp. 119–122, XP130830.

Ryan et al., "Intelligent Peripherals—The Required Component", Annual Review of Communications, National Engineering Consortium, vol. 46, Chicago, IL, US, pp. 644–649, XP321980.

INTELLIGENT COMMUNICATIONS NETWORKS

RELATED PATENT APPLICATIONS

This application is related to our commonly assigned commonly filed application Ser. Nos. 08/311,015 (now abandoned) and 08/311,759 (now abandoned).

BACKGROUND OF THE INVENTION

1. Field of the Invention

This invention relates to a method of and a service node for providing services in an intelligent communications network.

2. Related Art

Before the advent of the stored program controlled (SPC) exchange, the Public Switched Telephone Network (PSTN) comprised electromechanical exchanges, such as Strowger and Crossbar exchanges, and electronic exchanges, such as TXE2 and TXE4 exchanges. However, even the most advanced of these types was only capable of performing a limited number of functions over and above merely switching a call, i.e. making a connection between an incoming channel or line and an outgoing channel. Furthermore, such additional functions were limited to operations for improving the performance of the network, for example, a repeat attempt at reaching a destination number via an alternative outgoing route in the event that the first-choice route is busy.

SPC exchanges enabled customers to control various supplementary services via signals entered on their telephone keypad using the * and # buttons. However, the introduction of a new service, or the modification of an existing service, meant that the control program had to be updated in each of the SPC exchanges.

The current concept of an intelligent communications network is based on a core of interconnected Main Digital Switching Units (MDSU's), with local exchanges connected to the MDSU's (usually with each local exchange connected to two MDSU's for network resilience in the event of an MDSU failure), and with services being provided and controlled by discrete service nodes at various positions in the network.

Each service node is connected to an MDSU of the network, which recognizes service access digits dialled by a customer and routes the call to the service node for the provision of the requested service for the customer.

SUMMARY OF THE INVENTION

According to a first aspect of the present invention there is provided a service node for use in an intelligent communications network for providing services for customers, comprising:

service defining means arranged to define a plurality of services;

a first resource comprising a store for storing speech segments, each segment having a corresponding identity, and resource controlling means arranged (i) to convert a received command signal to a corresponding succession of speech segment identities for a speech announcement corresponding to the command signal, (ii) to access the speech segment store in accordance with said speech segment identities, (iii) to generate the corresponding speech segments for the speech announcement and (iv) to provide an announcement finished signal when a last speech segment of the announcement has been generated;

a switch arranged to connect the first resource to an incoming call routed by the network to the service node; and node controlling means arranged to respond to such an incoming call (i) to pass details of the call to the service defining means for processing and queuing the call for subsequent processing if required due to already ongoing call processing, (ii) to logically connect the service defining means to the first resource and to the switch, and (iii) to pass announcement finished signals from the first resource to the service defining means.

If the service defining means has total control of the service, it will construct an announcement by commanding a resource to generate a first segment, wait for receipt of a segment generated signal from the resource, and then send the command for the next segment, and so on. An advantage of the present invention is that the gaps between segments can be determined for optimum speech reproduction and controlled directly by the resource, rather than being determined by the transmission and processing delays that these signals are subject to because the node controlling means has to communicate with the resource over a communications link.

Preferably, the first resource further comprises means for recognizing customer-provided data and for storing the resultant recognized data.

Alternatively, a service node may further comprise a second resource having means for recognizing customer-provided data and for storing the resultant recognized data, and the first resource may be arranged to command a connection between the second resource and the incoming call and to command the second resource to activate a recognizing and storing means and to provide stored data therefrom to the first resource.

The first resource may be arranged to itself make said connection.

A first resource may send the data to the service defining means or, as the case may be, command the second resource to send the data to the service defining means.

More preferably, the first resource further comprises a database of customer-related data and means arranged to validate recognized customer-provided data by comparison with corresponding data stored in the database of customer-related data for the customer.

Alternatively, a service node may further comprise a third resource having a database of customer-related data and means arranged to validate recognized customer-provided data by comparison with corresponding data stored in the database of customer-related data for the customer, and wherein the first resource is arranged to provide recognized data to the third resource and to command it to validate the provided data and provide to the first resource a signal indicative of the validation.

In such a service node, the first resource may be arranged to generate an announcement offering the customer a first plurality of numbered service-related options and to generate a further announcement offering a second plurality of numbered service-related options on receipt of a recognized number from the customer.

A service node will have a multiplicity of such resources so as to be able to handle many simultaneous calls to that service. A resource will have sufficient intelligence to perform a significant proportion of the service and gain the advantage of reduced communication with the service defining means and yet not be so intelligent that the resources become an unduly high proportion of the cost of the service node.

In accordance with a second aspect of the present invention there is provided a method of operating a service node in an intelligent communications network for providing services for customers, comprising the steps of:

receiving an incoming call routed by the network to the service node and passing details of the incoming call to a service defining means for processing and queuing the call for subsequent processing if required due to already ongoing call processing;

connecting a speech announcement resource to the incoming call in response to a request from the service defining means;

sending a command signal from the service defining means to the resource;

converting the command signal received by the resource to a corresponding succession of speech segment identities;

accessing memory storing speech segments in accordance with said speech segment identities;

generating the corresponding speech segments;

and providing an announcement finished signal when a last speech segment of the announcement has been generated.

Preferably, a method in accordance with this second aspect further comprises the step of recognizing customer-provided data and storing the resultant recognized data.

The recognizing and storing step may be performed by the speech announcement resource or by a separate resource.

In method comprising the above recognizing and storing step there may be further provided the step of validating recognized customer-provided data.

The above-mentioned validating step may be performed by the speech announcement resource or by a separate resource.

In methods comprising the step of recognizing customer-provided data and storing the resultant recognized data there may be further provided the step of generating an announcement offering the customer a first plurality of numbered service-related options and generating a further announcement offering a second plurality of numbered service-related options on receipt of a recognized number from the customer.

BRIEF DESCRIPTION OF THE DRAWINGS

A specific embodiment of a service node in accordance with the present invention will now be described by way of example with reference to the drawings in which:

FIG. 4 is a diagram showing initialization of the Call Instance;

DETAILED DESCRIPTION OF PREFERRED EMBODIMENTS OF THE INVENTION

Figure 1:
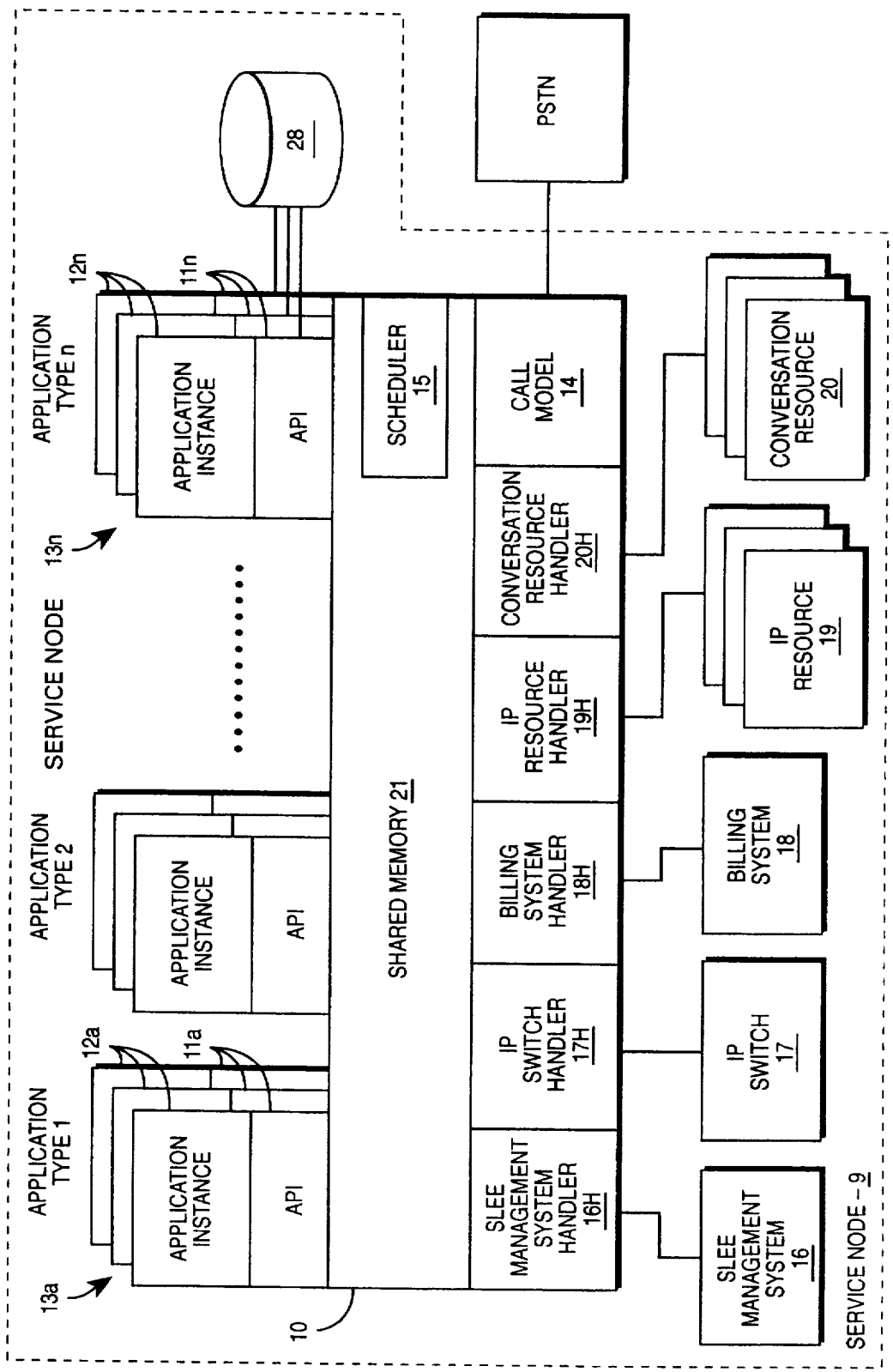
FIG. 1 is a schematic diagram of a Service Logic Execution Environment of the service node.

As can be seen in FIG. 1, the major part of the service node 9 of the present invention is the central control function which is designated the Service Logic Execution Environment (SLEE) 10 and which constitutes a controlling means of the present invention.

The SLEE 10 comprises a respective Application Programming Interface (API) process, 11a to 1n, for each of a plurality of Application Instances (constituting service defining means of the present invention), 12a to 12n, in each of a plurality of Application Types, 13a to 13n, a Call Model process 14, a Scheduler process 15, and a handler process for each of a plurality of subsystems of the service node, namely SLEE Management System 16, Switch 17, Billing System 18, a plurality of Intelligent Peripheral (IP) Resources 19 having a common handler 19H, and a plurality of Conversation Resources 10 having a common handler 20H.

In this specification the terms Intelligent Peripheral and Service Node are to be taken as having the same effective means, although, in practice, a Service Node is constituted by an Intelligent Peripheral together with a switch 17.

In this embodiment, each of the IP Resources 19 (constituting a first resource of the present invention) is a speech applications platform (SAP) containing its own digit collection means. In alternative embodiments, there are a plurality of digit collection means (each constituting a second resource of the present invention) which can be reserved and associated with a SAP as and when needed for services involving digit collection.

Each of the Conversation Resources 20 is a non-speech resource, i.e. a resource which is not connected to a port of the switch 17 and which is not arranged to send or receive signals from the customer (MF signals or speech). Examples of types of Conversation Resources 20 are personal identification number (PIN) validation, protocol conversion for when the service node needs to communicate with a remote resource or system, and management logic for managing entries in database 28.

For convenience, the above processes will generally be referred to by the process name, and each handler will be identified as 16H, 17H, etc. Handler 19H has an internal part 19Hint which interfaces signals between applications and a Shared Memory 21 of the SLEE, and an external part 19Hext which interfaces signals to and from the IP Resources 19.

Each of the component parts of the SLEE 10 is implemented as UNIX (a trade mark of AT&T) process on a platform which need not be described in detail but which is in the form of a multi-processor, multi-tasking, fault tolerant UNIX environment. Where appropriate, these processes comprise sub-processes for both-way communication of messages. Such sub-processes are well known to the skilled person in the art and will not be mentioned specifically, apart from Switch Message Handler, which constitutes a message receiving sub-process of the Switch Handler 17H.

The component processes of the SLEE 10 communicate with each other through a block of the Shared Memory 21 which they can all access. This arrangement of separate processes working in parallel greatly reduces the likelihood of serious bottlenecks.

Application Instances are started up by the SLEE Management System 16 at the initialization of the SLEE 10 and each new call entering the platform creates a new Call Instance 22 (FIG. 2) in the Shared Memory 21.

Figure 2:
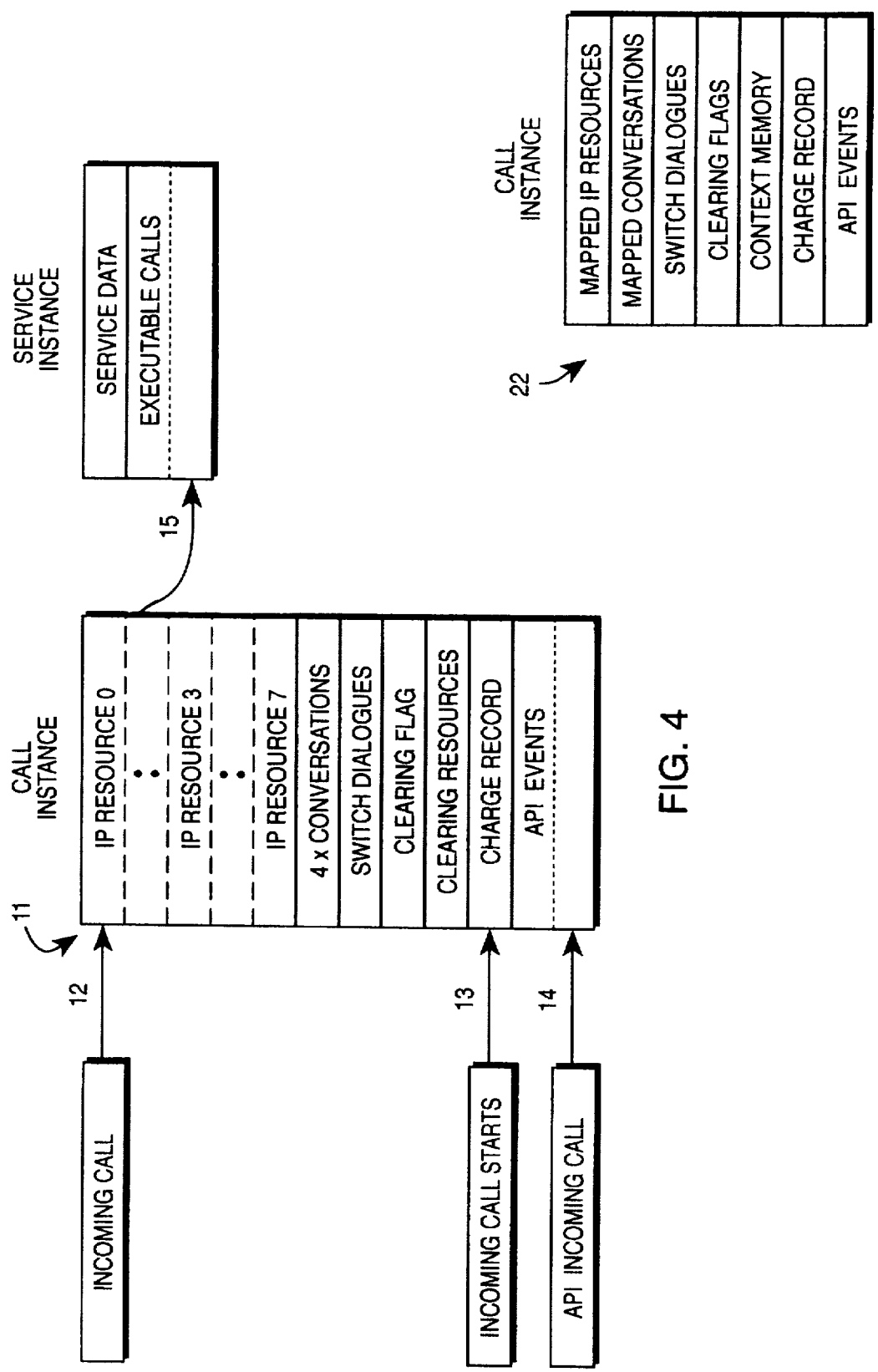
FIG. 2 is a diagram showing the storage locations of a Call Instance used in services provided by the service node.

Each Call Instance 22 holds data specific to a respective call, and the various categories of data shown in FIG. 2 are Mapped IP Resources, Mapped Conversations, Switch Dialogues, Clearing Flags, Context Memory, Charge Record, and API Events. Some of these categories have more than one storage location in the Call Instance, e.g. IP Resource and API Events.

Each Application Type 13 can provide one or more defined services, and different calls (possibly using different services) can all share any one Application Type 13 by being cut in and out as the application requires. The Context Memory of a Call Instance 22 is used by an application to keep track of the state that a call is in.

Multiple Application Instances 12 of the same Application Type 13 are provided in order that a number of calls using the same service can run in parallel. The Scheduler 15 of the SLEE 10 manages the allocation of calls to the Application Instances 12 so that call events can be processed.

Figure 3:
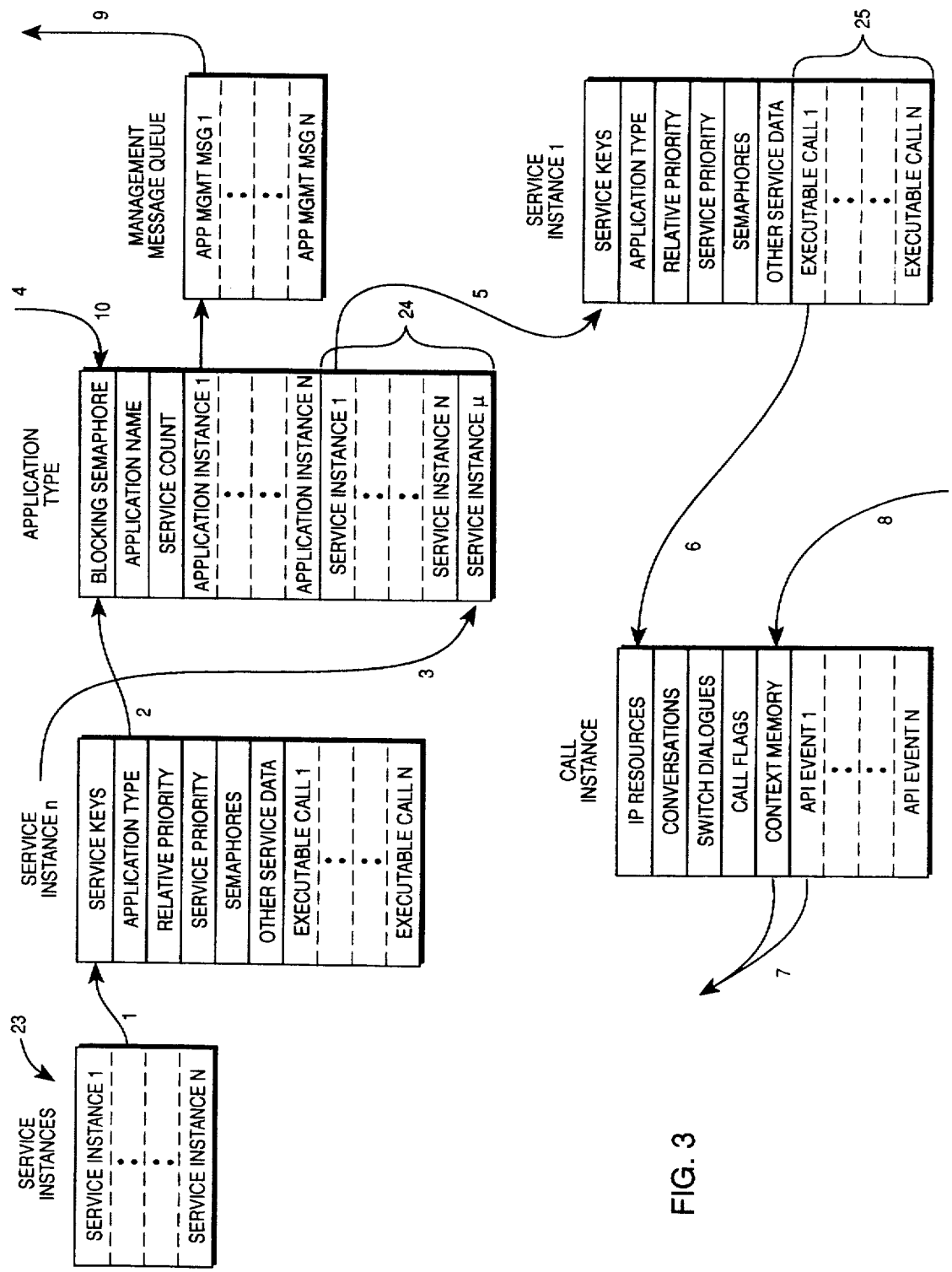
FIG. 3 is a diagram showing the processing of a Call Event.

As external events occur, the handlers queue them on their respective Call Instances 22. FIG. 3 shows the various steps by which these call events are retrieved and sent to an application for processing.

The Scheduler 15 decides which service will be the next to run on the basis of the relative priorities of each Service Instance 23. These priorities are recalculated each time that the Scheduler 15 is activated such as to ensure that while all services will run at some time, those with higher service priorities (which are set by the SLEE Management System 16) will run more often. The Service Instance with the highest relative priority and with Executable Calls queued on it is chosen to be run (step 1). The Scheduler 15 retrieves the service's owning Application Type (step 2) and adds the Service Instance 23 to the bottom of the Service Queue 24 (step 3). A Blocking Semaphore in the Application Type 13 is increased by the Scheduler 15 (step 4), signalling that another call is ready to be processed by one of the Application Instances 12 belonging to this Application Type 13. When this happens, the next Service Instance 23 is moved off the queue 24 (step 5) and the next Call Instance 22 is removed from its Executable Call Queue 25 (step 6). The first API Event belonging to this Call Instance 22 is sent together with the call's Context Memory to the application to be processed (step 7).

The application performs the tasks necessary to act upon this event, and upon completion of those application tasks it issues an API Suspend command and then an API Provide Instruction command, and modifies the Context Memory (step 8) to reflect the change of state of the call. Any Management Events queued for the application are issued to it (step 9) before the process blocks on its semaphore (step 10) ready for the next call event.

The application sends the API Suspend command to the SLEE 10 to release (dissociate) the Call Instance 22 from the application, and sends the API Provide Instruction command to cause the application to become blocked ready for the next call.

There now follows a description of the processes which occur for a typical call scenario for a message recording service provided by the service node. While there are many difference tasks that can occur, every call using the platform proceeds in a similar way to the following description.

Assume that a customer has subscribed to a network-based message recording service (hereinafter referred to as "voicemail service"), the platform (not shown) for which includes a database for storing deposited spoken messages and is associated with an MDSU of the PSTN. When the customer has activated the voicemail service, calls to the customer are automatically connected by the network to the platform and any desired spoken messages (hereinafter referred to as "voicemail messages") are recorded for later retrieval by the customer, and the voicemail platform will send information about the voicemail messages (customer account number, caller's name) to the application in the service node for storage in the database 28, which increments the stored calls register associated with that account number and stores the name in association with an index representing the current position of that voicemail message in the voicemail platform database.

When the customer wishes to find out if he has any voicemail messages waiting for him, he dials the service access digits for gaining access to the voicemail service and the PSTN routes the call (regardless of where it has originated on the network) to the service node.

Referring to FIG. 4, in which the steps are numbered starting from 11, when this call arrives at the service node the digits are passed via a signalling link from the switch 17 to the Call Model 14 which recognizes the dialled service access digits for the voicemail service and, in response, creates and initializes a new Call Instance 22 (step 11) within the SLEE's Shared Memory 21 and maps the incoming call to its first IP Resource, namely IP Resource 0 (step 12). The actual IP resource will be the incoming channel on which the incoming call appears and it will be the identity of this channel that will be mapped to the IP Resource 0 location of the Call Instance 22. The Call Model 14 initializes the call's Charge Record by recording the incoming call or event with a time stamp (step 13) in the Charge Record location of the Call Instance 22. The SLEE 10 then puts an API Incoming Call event on the call's API Events queue (step 14) and queues the Call Instance 22 as an Executable Call on the appropriate Service Instance 23 (step 15).

The Scheduler 15 is triggered and the call event processing phase is entered, as described with reference to FIG. 5.

Figure 5:
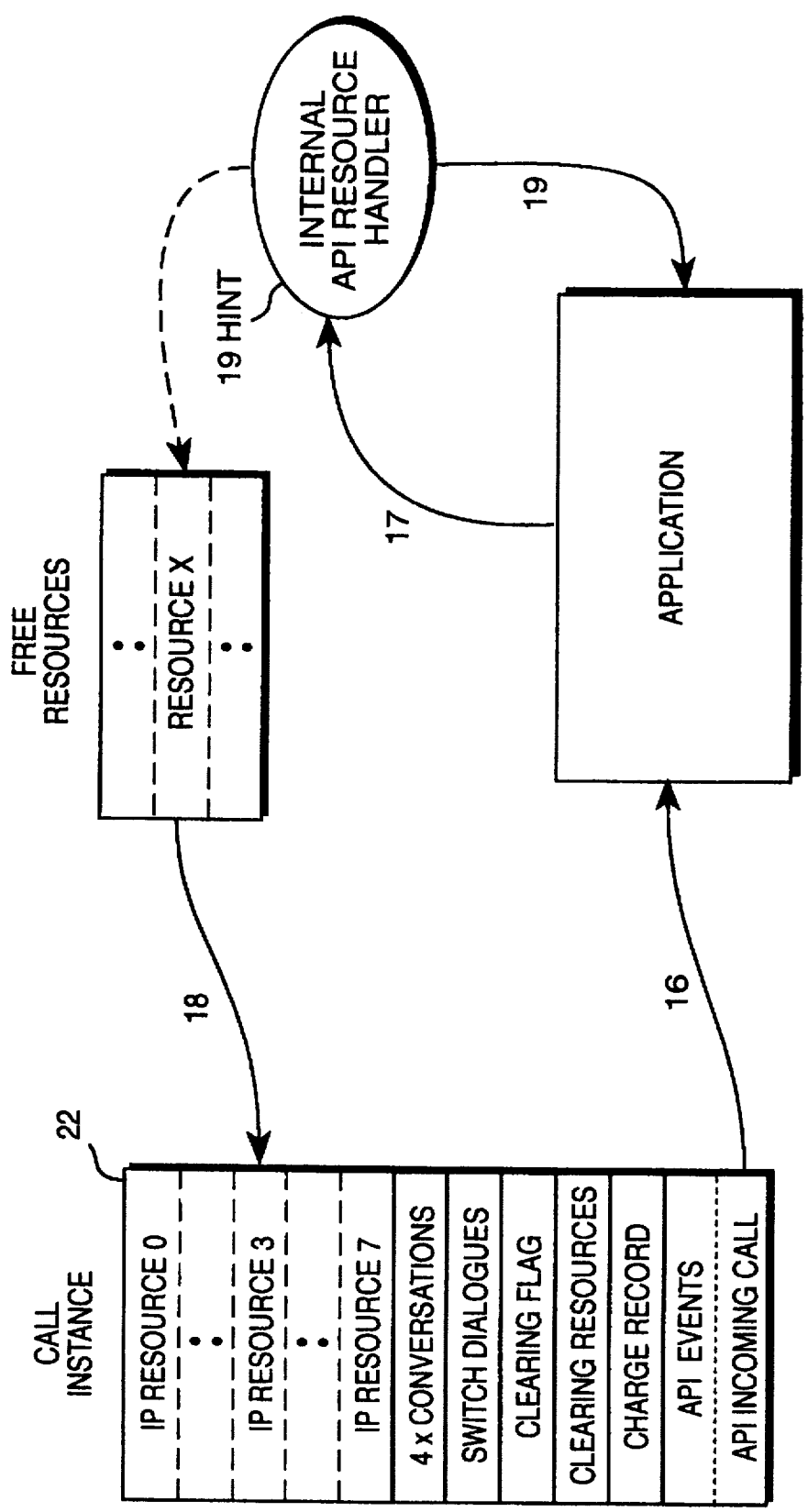
FIG. 5 is a diagram showing the allocation of a resource to the Call Instance.

Referring to FIG. 5, when the Scheduler 15 decides that it is time for a call to execute, the SLEE 10 sends to the Application 13 the API Incoming Call Event from the Call Instance's API Events queue (step 16). The application receives this event, refers to a state table of events (not shown) and runs from the next following position, which in this case of a new call is from the beginning of the service.

The application will require the use of at least one IP Resource other than IP Resource 0. First, it must reserve a resource on a free one of the call's application-mapped IP Resources (e.g. Resource 3) by sending an API Reserve Resource message to the SLEE 10 (step 17). The application will itself select the free IP Resource in the Call Instance 22 and ask the SLEE 10 to reserve a free resource and map its identity to the selected IP Resource. The SLEE's Internal API Resource Handler 19Hint receives the message, finds a free (unused) resource of the correct type in the Free Resources store (Resource X) and maps it to the call by moving the resource identity from Free Resources to the Call Instance's IP Resource 3 (step 18). In this step, the resource may be actually removed from Free Resources, or it may be effectively removed by setting a flag to mark that resource as in use and not free. A success message is returned to the application as a return code (step 19).

Figure 6:
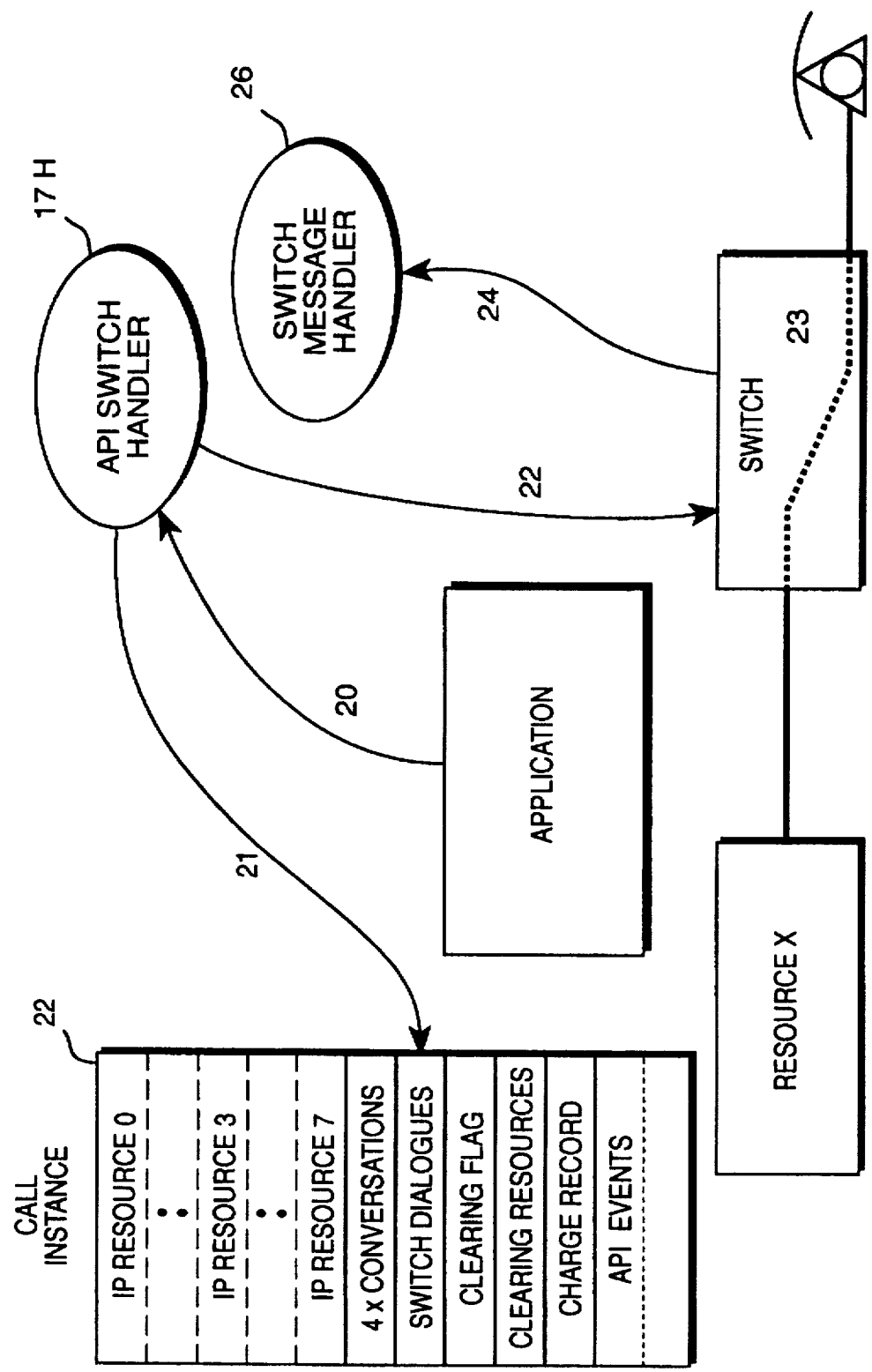
FIG. 6 is a diagram showing the connection of a speech path between the resource and a caller.

To make use of the resource the application must connect its speech channel to that of the call as shown in FIG. 6. It does this by sending an API Connect message (step 20) with reference to the two resources it wants to connect (i.e. IP Resource 0, the incoming call, and IP Resource 3, the required resource).

The SLEE's API Switch Handler 17H receives the message, allocates (reserves) a free Switch Dialogue Id to the Call Instance 22 (step 21) and uses it to send a request for connection to the switch 17 (step 22). The switch 17 receives the request and connects the call to Resource X (step 23). It signals success back to a Switch Message Handler 26 of the SLEE 10 (step 24).

Figure 7:
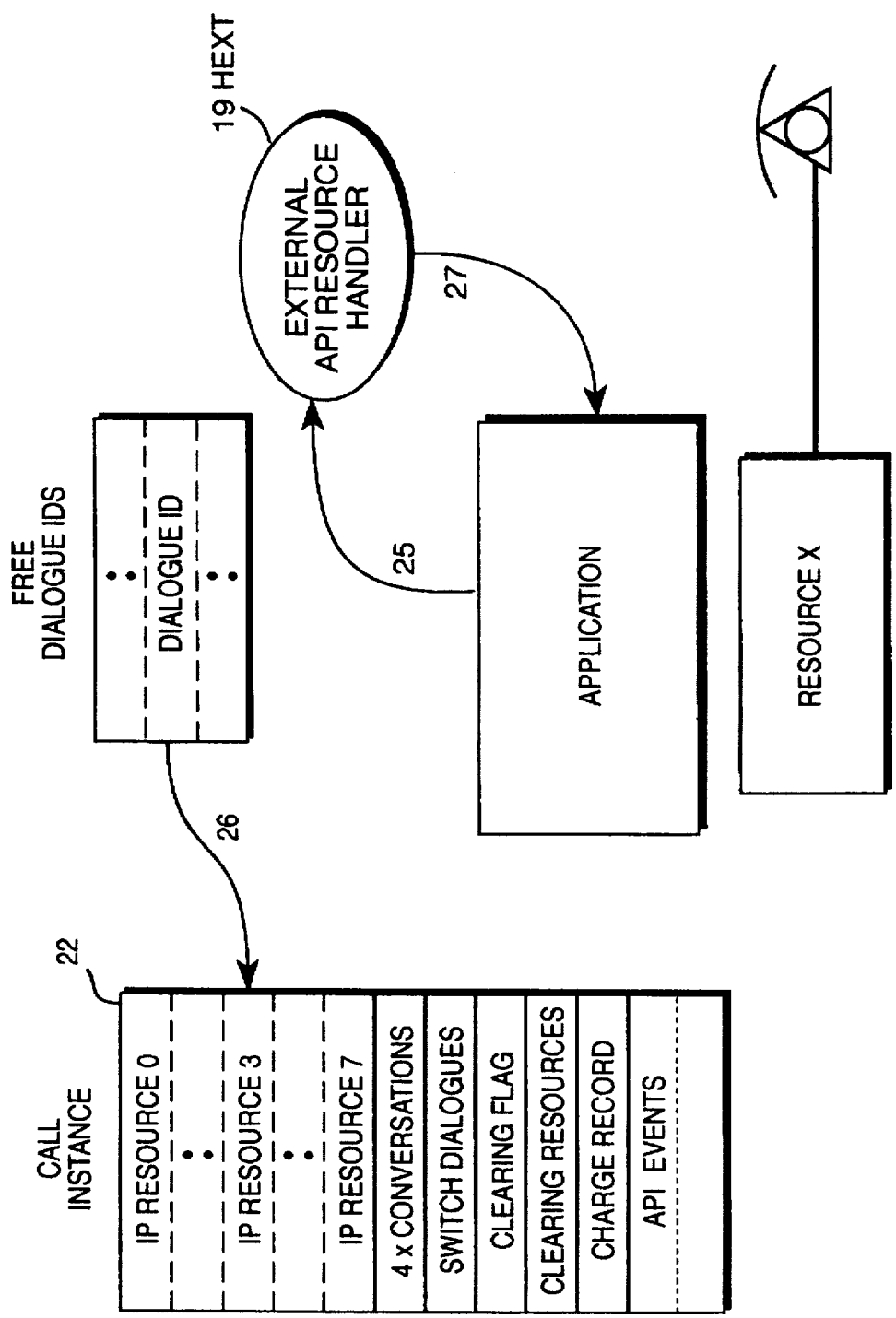
FIG. 7 is a diagram showing the command of the resource by an application.

Having reserved a resource, the application now communicates with it, for example in this scenario it requests that the resource play a recorded announcement to the customer. It does this, as shown in FIG. 7, by sending an API IP Resource Command to the SLEE 10 with the announcement type included (step 25). The SLEE's External API Resource Handler 19Hext receives this message and sets up a dialogue with the resource by allocating an Id from the Free Dialogue Id's store to the call's Application IP Resource (step 26). It then associates this Dialogue Id with the command and sends it to the mapped resource (step 27).

Having sent such a command, the application will leave the resource to generate the announcement and proceed to handle another call under the control of the Scheduler 15. To do this, the application must suspend the call by first sending an API Suspend command to the SLEE 10, and then sending an API Provide Instruction command.

In this scenario, this first API Resource Command is for generating a "Welcome" announcement and for collecting twelve digits representing the customer's account number and personal identification number (PIN).

Figure 8:
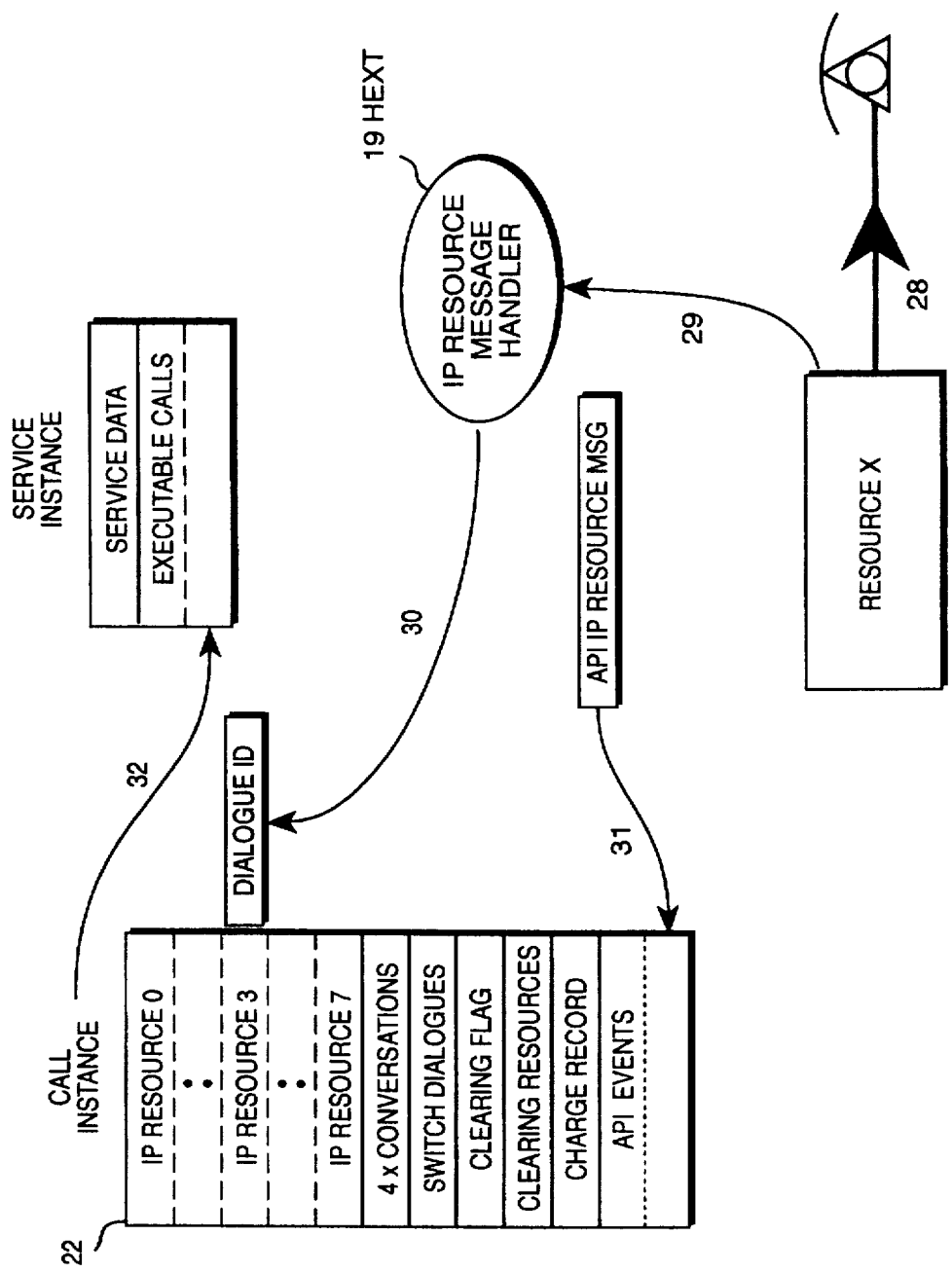
FIG. 8 is a diagram showing the response of the resource.

In FIG. 8, Resource X receives the application's command and starts generating the Welcome announcement, "Welcome to Voicemail. Please enter your account number and PIN." (step 28). Resource X is arranged to identify digits received at any time after the start of the Welcome announcement, and to stop generating the announcement at the time that the first of these digits is received and recognized.

On receipt of the first digit, Resource X sends to the SLEE 10 an API Event message including the value of the first received digit. This message is queued on the API Events section of the Call Instance 22. For the purposes of the present invention it is sufficient to state that this application requires the first digit to perform an initial part of the account number processing, and that not all applications involving account numbers require the first digit for initial processing. The dialogue between the application and the Resource X has not yet finished, i.e. it remains open, so the Dialogue Id is permitted to remain associated with the Call Instance's IP Resource.

In alternative embodiments Resource X contains means to perform validation of the customer's account number and PIN, by accessing a database of customer-related data and comparing a retrieved customer-associated PIN with the customer's dialled PIN. The term "dialled" includes both digits manually entered via a telephone instrument or equivalent, and digits spoken by the customer and recognized by Resource X. In embodiments in which Resource X does not include such validation means, these means may be provided in one of the conversation Resources 20 constituting a third resource of the present invention.

Normally, the customer will enter his eight digit account number and his four digit PIN with a timeout started at the beginning of the announcement, and when twelve digits have been collected the Resource X will send to the SLEE 10 (step 29) a Digits Collected message containing the digits, this message being associated with the same Dialogue Id as was sent to the Resource X by the SLEE 10 with the command.

If the customer had failed to enter twelve digits before the timeout, or if for any other reason Resource X had not collected twelve recognized digits within the timeout, Resource X would have sent a Collection Failure message to the SLEE 10.

The application will deem the dialogue finished upon receipt of either the Digits Collected message or the Collection Failure message and will proceed to remove the Dialogue Id and to place it back in the list of free Dialogue Id's.

The SLEE's External IP Resource Message Handler 19Hext receives the message and retrieves the Call Instance 22 by means of the association with the Dialogue Id (step 30). The message is then added to the Call Instance's API Events queue as an API IP Resource Message (Msg) event (step 31) and the Call Instance 22 itself is added to the list of Executable Calls of the owning Service Instance (step 32). The Scheduler 15 is now triggered once again.

Figure 9:
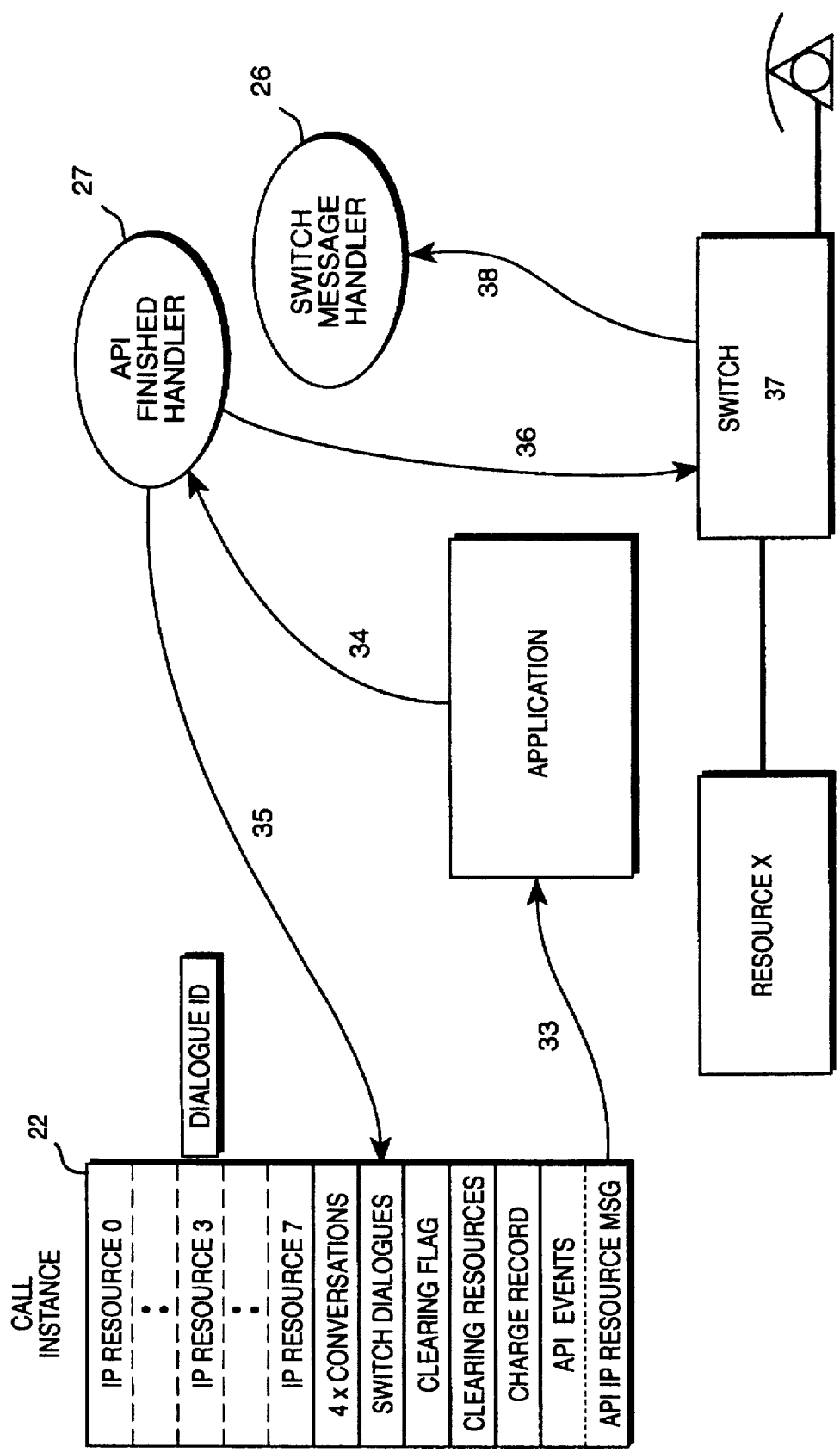
FIG. 9 is a diagram showing the procedure when the application has finished.

When the Scheduler 15 decides that it is the call's turn once more, the API IP Resource Msg event, and the message itself, are sent to the application (step 33), as shown in FIG. 9.

The application now proceeds to the next following state in the state table for the service and accesses a database 28 associated with that application type using the collected account number to retrieve a PIN stored with the account number and to compare the retrieved PIN with the collected PIN.

If the PIN's match, the application accesses the database again to retrieve the customer style of address and the time (including date) when the last retrieve access was made, and to overwrite that time with the time of the present retrieval access. The application now sends a second API Resource command including two fields containing respective variable parameters, the first being the customer's address style and the second being the last retrieval time (including date). The application then sends an API Suspend command and an API Provide Instruction command and waits for the Scheduler 15 to send it details from the next selected Call Instance 22.

The SLEE 10 now allocates a new Dialogue ID, by the External IP Resource Handler 19Hext, and passes this second API Resource command to the Resource X in the same way as for the first API Resource command. On receipt, the Resource X generates an announcement having a number of fixed components and a number of variable components, namely, "Hello" (fixed), "Andy." (variable, the customer's style of address), "You last used voicemail at" (fixed), "three thirty pm" (variable), "on the" (fixed), "tenth" (variable), "of" (fixed), "June." (variable.) This provides a measure of security, because if the customer had not accessed voicemail on that occasion he will now know that someone else was in possession of his PIN and can take steps to change his PIN. This can be done by the customer contacting an operator who, after making appropriate security investigations, will make a call into the service node and via a management logic type of Conversation Resource 20 modify the database 28, this resource making a "call" request via its handler 20H to create a call instance in which its identity is entered at Conversation Resource 0.

When the Resource X has finished generating this second announcement it will send an API IP Resource Message to the SLEE 10 which will enter it in the Call Instance's API Events queue.

When the application next processes this Call Instance it will go to the next state which is to inform the customer how many voicemail messages have been deposited in his voicemail store. The application accesses the database to retrieve the number of deposited voicemail messages and sends a third API Resource command including a field containing this number and another field containing the time. Again, the application then sends an API Suspend command and an API Provide Instruction command.

The SLEE 10 sends this third command to Resource X, which is still reserved for this call, by allocating a free Dialogue ID in the same manner as before.

Resource X responds to this third command by generating an announcement comprising a plurality of components, two of which are variable components. The first component is "Good", which is fixed. The second component is variable and is selected from "Morning", "Afternoon", or "Evening" depending upon the value in the time field of the received command, i.e. the Resource X has three time windows, midnight to midday, midday to 6:00 PM and 6:00 PM to midnight, and makes the selection by comparing the time value with the window boundaries to determine the appropriate window and hence the corresponding component. The third component is "Welcome to voicemail. You have", which is fixed. The fourth component is variable and is selected from a range of words (speech segments) corresponding to the possible number of voicemail messages in the voicemail message database, in other words, from "no" to, for example, "twenty". The fifth component is "new", which is fixed. The sixth component is variable and is selected from "message" or "messages" depending upon whether there is a single voicemail message or a plurality of voicemail messages or no voicemail messages.

In practice, the application will have further stages, e.g. asking the customer if he wants to know the names of the people who have deposited voicemail messages (when depositing a voicemail message they would have been asked to state their name), informing the customer of those names (possible in association with voicemail message numbers), receiving the customer's selection and generating the voicemail message (by retrieval from the voicemail platform database via a protocol conversion type of Conversation Resource 20 over a communications link between the service node and the remote platform), asking the customer if he wants to delete the voicemail message or leave it or archive it, and managing the voicemail message database in the event that the customer hangs up (terminates his call) during generation of a deposited voicemail message. However, the skilled person in the art will understand the operation of the service node and its SLEE sufficiently without a detailed description of such further stages of the voicemail service.

In alternative embodiments the Resource X has sufficient intelligence by virtue of its controlling program to generate an announcement offering the customer a plurality of numbered service-related options, e.g. "For service option A, press one, for service option B, press two, etc." and to generate a further respective announcement offering a different plurality of numbered service-related options on receipt of a recognized number from the customer. In other words the resource plays tree-structured menus to ascertain what the customer wants, and either provides the requested service it is has that capability or sends a command with appropriate customer-associated data to the SLEE for action by the appropriate Application Type.

When the application reaches a final state, e.g. has received from the customer a positive indication that he is terminating his access to the service or has received from the Resource X that a timeout has occurred, then it sends an API Finished signal to the SLEE 10. This is received by an API Finished Handler 27 of the SLEE 10 which commences to clear down the call.

First, the SLEE 10 must disconnect the speech paths. It allocates a free Switch Dialogue to the Call Instance 22 (step 35) and sends a message to the switch 17 requesting the disconnection of Resource X and the caller (step 36). The switch 17 performs the disconnection (step 37) and returns a Disconnection Complete message back to the SLEE 10 (step 38).

Figure 10:
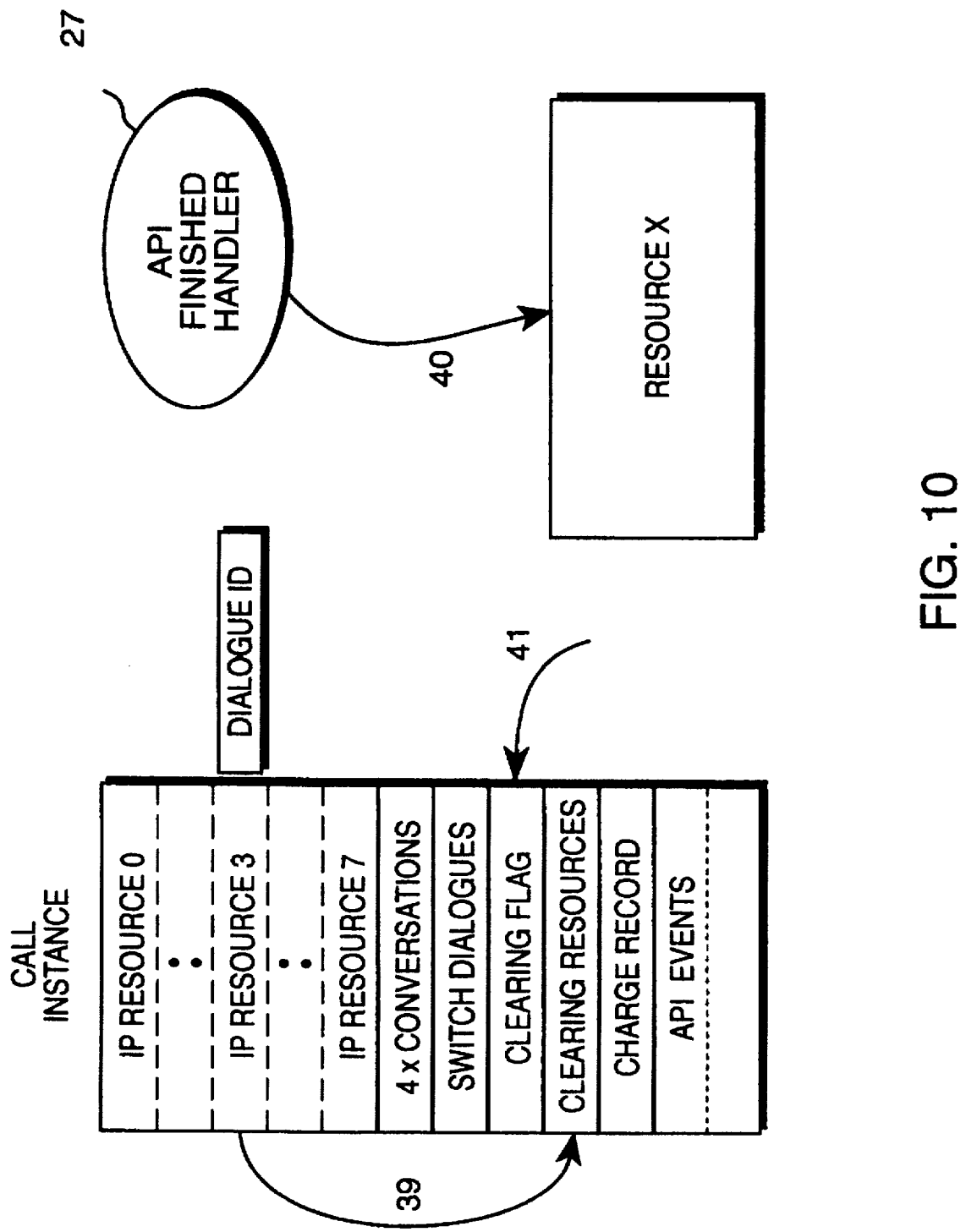
FIG. 10 is a diagram showing the procedure when the call clears.

If Resource X is still in open dialogue with the SLEE 10 then it must be cleared down. The SLEE 10 does this as shown in FIG. 10, by first sending the mapped IP Resource 3 into clearing by moving the mapped resource into the Call Instance's Clearing Resources location (step 39), and then sending a Clear Down message to Resource X (step 40). The incoming call is cleared in a similar way through the Call Model 14 and the call is marked as currently being cleared down (step 41).

Figure 11:
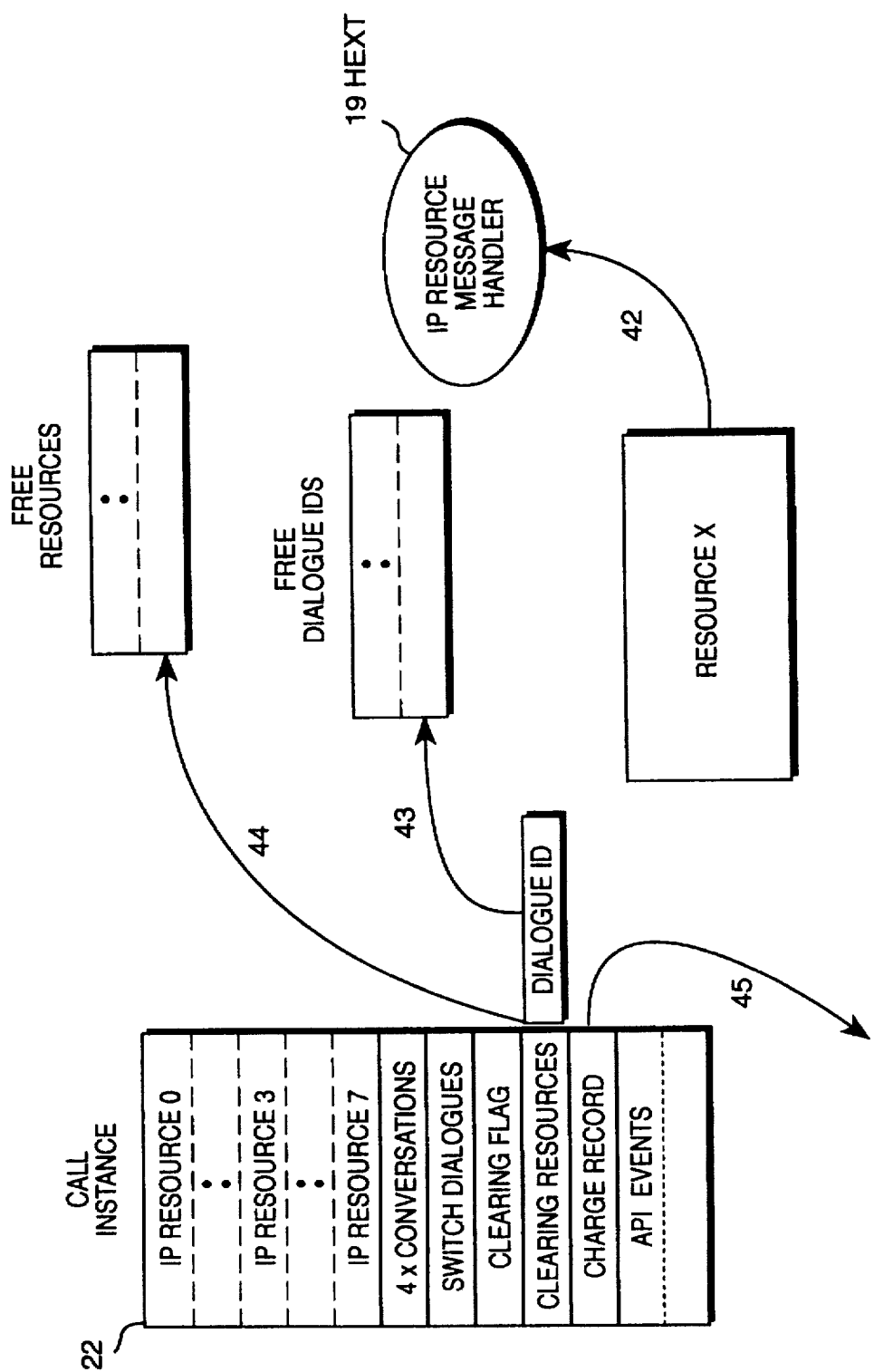
FIG. 11 is a diagram showing the procedure when the resource clears down.

Resource X receives the message and initiates its clear down procedure as shown in FIG. 11. When it has finished clearing down, it sends a Clear Down Complete message to the SLEE 10 (step 42). This message is received by the SLEE's External IP Resource Message Handler 19Hext which retrieves the Call Instance by means of the association with the Dialogue Id. This Dialogue Id is removed from the resource and placed back in the Free Dialogue Ids store (step 43). The resource itself is moved out of the Call Instance 22 and back into the Free Resources store (step 44).

If this was the last resource to clear belonging to the call (i.e. the incoming call has also finished clearing) then the call is complete. The Charge Record is time stamped and then sent out to the Billing System 18 (step 45).

We claim:

1. A service node for use in an intelligent communications network for providing services for customers, said service node comprising:

service defining means arranged to define a plurality of services;

a first resource comprising means for recognizing customer-provided data and for storing said recognized data, a store for storing speech segments, each segment having a corresponding identity, and resource controlling means arranged (i) to convert a received command signal to a corresponding succession of speech segment identities for a speech announcement corresponding to the command signal, (ii) to access the speech segment store in accordance with said speech segment identities, (iii) to generate the corresponding speech segments for the speech announcement and (iv) to provide an announcement finished signal when a last speech segment of the announcement has been generated;

a switch arranged to connect the first resource to an incoming call routed by the network to the service node; and node controlling means arranged to respond to said incoming call (i) to pass details of the call to the service defining means for processing and queuing the call for subsequent processing if required due to already ongoing call processing, (ii) to logically connect the service defining means to the first resource and to the switch, and (iii) to pass announcement finished signals from the first resource to the service defining means.

2. A service node as in claim 1, further comprising a second resource comprising means for recognizing customer-provided data and for storing said recognized data, and wherein the first resource is arranged to command a connection between the second resource and the incoming call and to command the second resource to activate the second recognizing and storing means and to provide said stored data therefrom to the first resource.

3. A service node as in claim 1, further comprising a second resource comprising means for recognizing customer-provided data and for storing said recognized data, and wherein the first resource is arranged to make a connection via itself between the second resource and the incoming call and to command the second resource to activate the second resource recognizing and storing means and to provide said stored data therefrom to the first resource.

4. A service node as in claim 1, wherein the first resource further comprises a database of customer-related data and means arranged to validate recognized customer-provided data by comparison with corresponding data stored in said database of customer-related data for the customer.

5. A service node as in claim 1, further comprising a third resource having a database of customer-related data and means arranged to validate recognized customer-provided data by comparison with corresponding data stored in said database of customer-related data for the customer and wherein the first resource is arranged to provide recognized data to the third resource and to command it to validate the provided data and provide to the first resource a signal indicative of the validation.

6. A service node as in claim 1, wherein the first resource is arranged to generate an announcement offering the customer a first plurality of numbered service-related options and to generate a further announcement offering a second plurality of numbered service-related options upon receipt of a recognized number from the customer.

7. A method of operating a service node in an intelligent communications network for providing services for customers, said method comprising the steps of:

receiving an incoming call routed by the network to the service node and passing details of the incoming call to a service defining means for processing and queuing the call for subsequent processing if required due to already ongoing call processing;

connecting a speech announcement resource to the incoming call in response to a request from the service defining means;

sending a command signal from the service defining means to the resource;

converting the command signal received by the resource to a corresponding succession of speech segment identities;

accessing a memory storing speech segments in accordance with said speech segment identities;

generating the corresponding speech segments;

providing an announcement finished signal when a last speech segment of the announcement has been generated;

receiving, at the resource, customer-provided data;

recognizing said received customer-provided data; and storing said recognized data.

8. A method as in claim 7, wherein the recognizing and storing steps are performed by the speech announcement resource.

9. A method as in claim 7, further comprising the step of generating an announcement offering the customer a first plurality of numbered service-related options and generating a further announcement offering a second plurality of numbered service-related options upon receipt of a recognized number from the customer.

10. A method as in claim 7, further comprising the step of validating said recognized customer-provided data.

11. A method as in claim 10, wherein the validating step is performed by the speech announcement resource.

* * * * *